United States Patent
Rasband et al.

(10) Patent No.: US 11,874,727 B2
(45) Date of Patent: Jan. 16, 2024

(54) REMOTE SYSTEM HEALTH MONITORING

(71) Applicant: OX Labs Inc., Los Angeles, CA (US)

(72) Inventors: Matthew William Rasband, Highlands Ranch, CO (US); George Melika, Henderson, NV (US); David Sulock, Asheville, NC (US); Leonardo Cicconi, Inglewood, CA (US)

(73) Assignee: OX Labs Inc., Los Angeles, CA (US)

( * ) Notice: Subject to any disclaimer, the term of this patent is extended or adjusted under 35 U.S.C. 154(b) by 0 days.

(21) Appl. No.: 17/516,660

(22) Filed: Nov. 1, 2021

(65) Prior Publication Data

US 2023/0140084 A1    May 4, 2023

(51) Int. Cl.
  *G06F 11/00*  (2006.01)
  *G06F 11/07*  (2006.01)

(52) U.S. Cl.
  CPC ...... *G06F 11/0787* (2013.01); *G06F 11/0709* (2013.01)

(58) Field of Classification Search
  None
  See application file for complete search history.

(56) References Cited

U.S. PATENT DOCUMENTS

| | | | | |
|---|---|---|---|---|
| 8,869,036 B1 * | 10/2014 | Deshpande | ......... | G06F 11/3065 715/736 |
| 9,100,205 B1 * | 8/2015 | Deshpande | ............. | H04L 41/24 |
| 11,347,622 B1 * | 5/2022 | Agarwal | .............. | G06F 11/3466 |
| 2010/0131798 A1 * | 5/2010 | Fu | ........................ | G06F 11/3688 714/E11.002 |
| 2014/0169164 A1 * | 6/2014 | Oguchi | ................. | H04L 47/193 370/230 |
| 2018/0159754 A1 * | 6/2018 | Wiener | ................... | H04L 67/61 |
| 2019/0182312 A1 * | 6/2019 | Regan | ..................... | H04L 67/02 |

OTHER PUBLICATIONS

Google Scholar/Patents search—text refined (Year: 2022).*
Google Scholar/Patents search—text refined (Year: 2023).*
International Search Report and Written Opinion in International Application No. PCT/US2022/048582 dated Dec. 9, 2022.

* cited by examiner

*Primary Examiner* — Christopher S McCarthy
(74) *Attorney, Agent, or Firm* — Cognition IP, P.C.; Edward Steakley; Saleh Kaihani

(57) ABSTRACT

Service providers, such as website operators, may rely on interfacing with third-party systems over the Internet to provide services to their users. Outages and degraded responsiveness of these third-party systems can affect the efficiency of the operations of the service provider. The described embodiments allow a service provider to monitor the responsiveness of one or more third-party systems, including making predictions on the future reliability of those third-party systems. The described embodiments include various monitors, that use outgoing and incoming web traffic data from the service provider, to produce responsiveness parameters of third-party systems, based on which the service provider can dynamically route its outgoing traffic to the more reliable third-party systems.

20 Claims, 10 Drawing Sheets

REMOTE SYSTEM HEALTH MONITORING

BACKGROUND

Field

This application relates to the field of monitoring the responsiveness of a collection of remote systems and more specifically to dynamic routing of traffic to the more responsive remote systems amongst the collection of the remote systems.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Service providers using a computer network, such as the Internet, may interface with and rely on services of other service providers. For example, when a user enters a request in a website of a service provider, the request may be captured by the service provider, and forwarded to a remote system, with or without modification. In these instances, the service provider relies on the health of the remote system in order to respond to the user. Consequently, there is a need for tools and methods to enable a service provider to route its outgoing traffic to robust remote systems.

SUMMARY

The appended claims may serve as a summary of this application.

BRIEF DESCRIPTION OF THE DRAWINGS

These drawings and the associated description herein are provided to illustrate specific embodiments of the invention and are not intended to be limiting.

DETAILED DESCRIPTION

Figure 1:
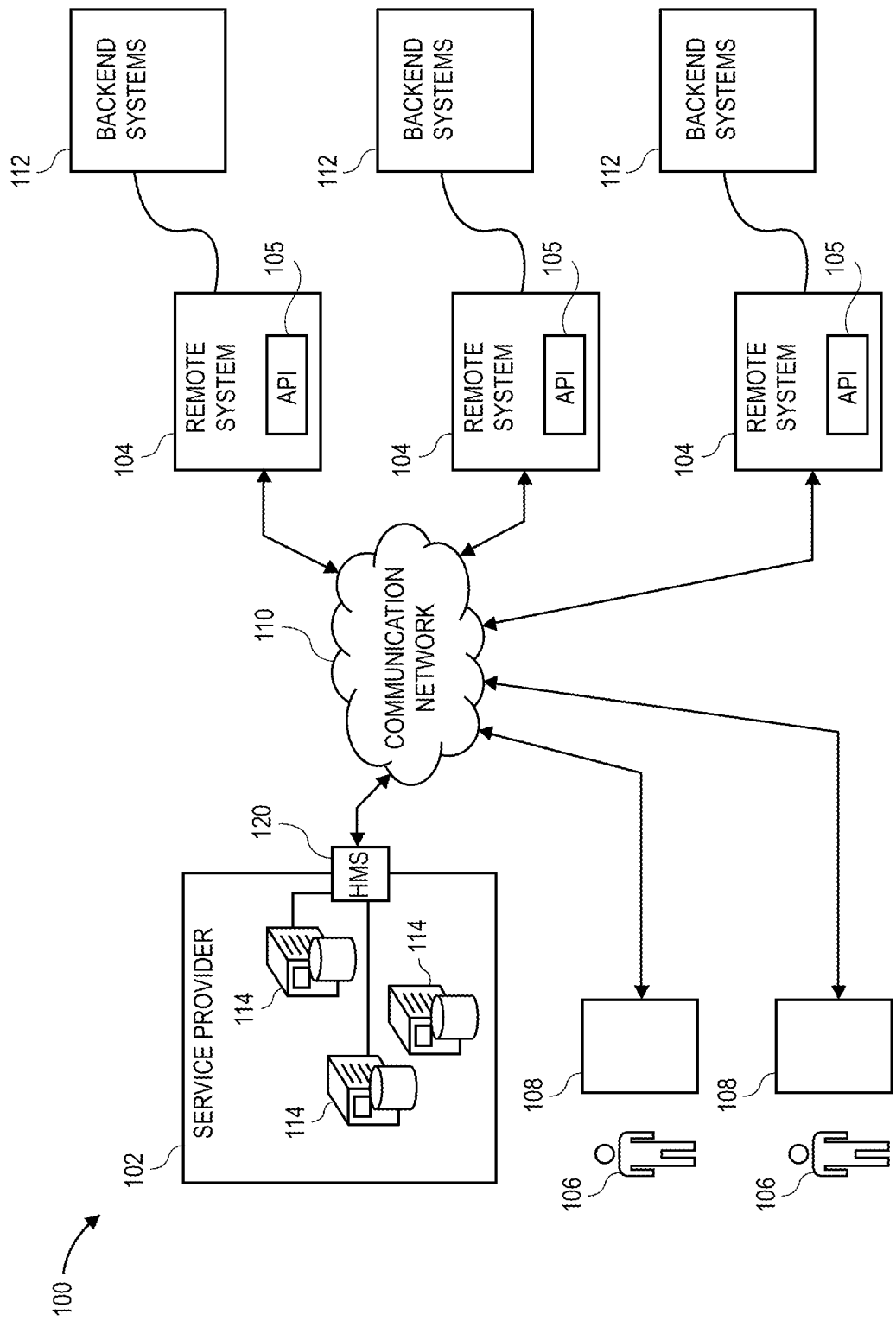
FIG. 1 illustrates a diagram of a computer network environment in which a service provider can interface with remote systems, in order to provide services to users.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

A service provider may be an intermediary between its clients and one or more remote systems on a computer network, such as the Internet. The service provider may receive orders or requests from its users and interface with a collection of remote systems in order to respond to its users. The remote systems may include a variety of servers and services, providing various functionality and/or data to the service provider, which the service provider can use to respond to its users. In some cases, the service provider can choose from amongst a collection of remote systems, in order to respond to a user's request. Often the service provider prefers to utilize the most efficient and available remote system. In this scenario, the service provider is interested in monitoring the health or responsiveness of a collection of remote systems, so it can avoid routing user requests to remote service providers who are down. The service provider can generate, maintain, and update metrics and parameters associated with the health and responsiveness of a collection of remote systems. The service provider can route its outgoing traffic (e.g., requests corresponding to client's requests) based at least in part on responsiveness parameters of a remote system.

FIG. 1 illustrates a diagram of a computer network environment 100 in which a service provider 102 can interface with remote systems 104, in order to service a user 106. The user 106 can interact with the service provider 102 via a user interface (UI) application 108. The UI application 108 may be a website, web application, mobile app or other software provided by the service provider 102. The service provider 102, users 106 and remote systems 104 may be connected through a communication network 110. The communication network 110, in some implementation, can be the Internet. The users 106 may not directly interact with the remote systems 104. Instead, the service provider 102 receives user requests for a service which the service provider 102 provides and send corresponding requests to one or more remote systems 104, in order to service the user's request.

The service provider 102 may include one or more local services 114 via which it services the user requests. The term "local" in "local services" is used to indicate the service provider 102 controls the local services 114. However, some or all local services 114 may be implemented in various geographical locations. In some embodiments, the service provider 102 may implement the local services 114 via a cloud infrastructure or on a network of servers local or remote to a single location. The term "remote" in "remote systems" is used to indicate the service provider 102 may not exert control over the internal operations of the remote systems 104, as they may be operated by parties independent from the service provider 102. The service provider 102 may communicate with the remote systems 104, sending and receiving traffic to and from the remote systems 104, using a variety of protocols, including HTTP, HTTP/REST, FIX, Websocket and others. Traffic can include requests sent from a local service 114 to a remote system 104 and responses received from the remote system 104. Requests and responses are sent via the communication network 110, using a communication protocol, which may be dictated by the remote system 104. The remote systems 104 may have their own internal or backend systems 112, which they can use to respond to a request from the service provider 102.

In one aspect, the service provider 102 integrates with a remote system 104, using a remote application programming interface (API) of the remote system or remote API 105. The API 105 can dictate communication protocols, format of the request, required request objects, format and protocol of the response and other communication parameters for a service provider 102 to use before it can connect with and use the services of a remote system 104.

The service provider 102 services users 106 and has an interest in knowing the health and responsiveness of the remote systems 104. For example, in some applications, servicing the user 106 may include making API calls to a remote system 104. If the remote system 104 is down or unresponsive, the service provider 102 may inadvertently default in servicing the user 106 requests. In some scenarios, the remote systems 104 offer similar services and solutions, albeit with varying parameters, requirements, and formats, as well as potentially different prices in some cases. Nonetheless, the service provider 102 can choose from amongst the remote systems 104, in order to service a user's request. While the service provider 102 may have preferences as far as, which remote system 104 to use, the service provider 102 has an interest in avoiding sending traffic to a remote system 104 if that remote system 104 is down or is predicted to be down, despite default preferences of the service provider 102. In other words, for some traffic, multiple remote systems 104 can provide responses and servicing. The service provider 102 can utilize the described systems and methods to monitor the health and responsiveness of the remote systems 104 and direct its outgoing traffic accordingly. In some embodiments, the service provider 102 can use the described technology to predict a downtime of a remote system 104 and route traffic to other remote systems 104. In some cases, the service provider 102 is positioned, by virtue of the services it provides, such that it makes substantial calls and sends numerous requests to the remote systems 104, in the normal course of its operations, enabling it to utilize a large collection of data to monitor the health of a remote system 104 and/or predict its future reliability.

In some embodiments, a health monitoring system (HMS) 120 may be implemented in an edge network of the service provider 102. The HMS 120 can be at the intersection of the traffic to and from the service provider 102 and can be configured to be able to monitor traffic and record various meta data associated with the incoming and outgoing traffic. The traffic data can be used to monitor the health of a remote system and/or predict its future reliability and/or responsiveness.

Figure 2:
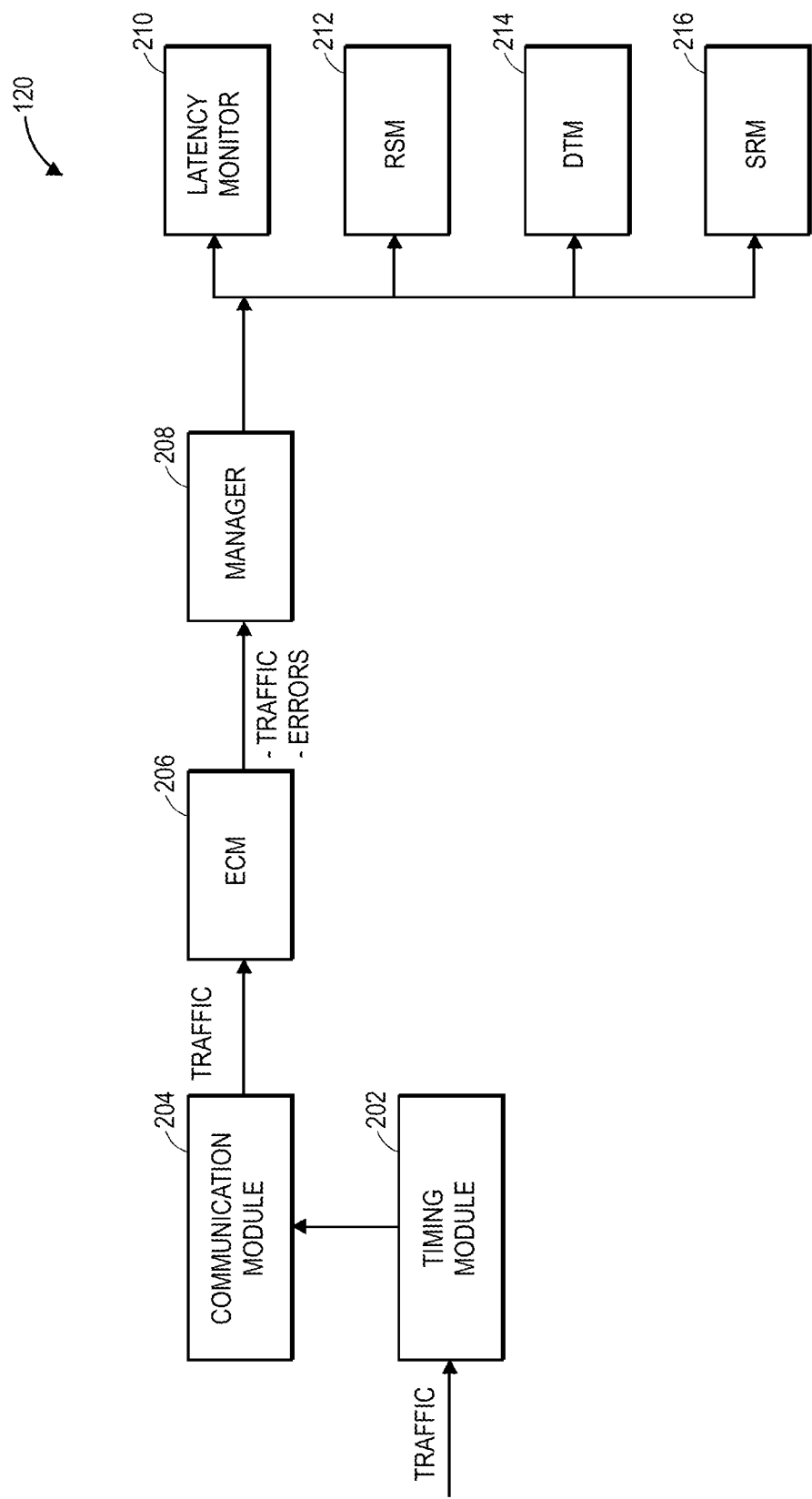
FIG. 2 illustrates an example diagram of a health monitoring system.

FIG. 2 illustrates an example diagram of the health monitoring system (HMS) 120. The HMS 120 can include a timing module 202. The timing module 202 can capture and record various traffic timing parameters for use by other modules of the HMS 120. Example traffic timing parameters include a time of sending a request, a time of receiving a response for the request, a duration of receiving an error message, and other timing parameters. The HMS 120 can include a communication module 204, which can perform operations, such as sending and receiving traffic. In some embodiments, the communication module 204 can, alternatively, in whole or in part, be implemented in the local services 114, which can send or receive the traffic. In this scenario, the HMS 120 is merely in the path of incoming and outgoing traffic.

The incoming traffic can pass through an error classification module (ECM) 206. The traffic can include data or metadata, indicating one or more error messages associated with a request/response pair. Depending on the protocol used, the traffic error data can be in a variety of formats. The ECM 206 can categorize the error messages, based on internal categories defined within the environment of the service provider 102. The error categories and classifications can be used by other parts of the HMS 120 and/or other components within the service provider 102 to route traffic dynamically.

In some embodiments, error categories can include rate limiting errors, remote errors, and timeout errors. Rate limiting errors can be generated when the service provider 102 makes more requests to a remote system 104, than the remote system 104 allows. In this scenario, the remote system 104 can issue an error message indicating the service provider 102 or one of its subsystems has exceeded a rate limit. In other words, too many requests are received from the service provider 102. Remote errors can refer to a category of errors, where one or more issues outside the control and the environment of the service provider 102 are causing an error in response. A remote error issue can be due to an issue in an intermediary in the communication network 110 or an issue with the remote system 104 and/or its servers. Remote error messages can be received by the ECM 206 in a variety of formats, depending on the parameters of communication between the service provider 102 and a remote system 104. For example, when HTTP communication protocol is used, responses, including an HTTP error message, in the range HTTP 500-599, can be mapped and categorized as remote errors. Remote errors can be used to detect or predict an issue with a remote system 104, and dynamically route traffic to a different remote system 104. On the other hand, when HTTP communication protocol is used, HTTP error messages in the range HTTP 400-499 can be mapped to errors internal to the service provider 102. The internal errors can be due to issues with the local services 114, or the manner in which they communicate with the remote systems 104.

The ECM 206 can classify an error message using various techniques, including generating tables, tagging, mapping tables or other methods of associating a request and its error message with a category. The error message may contain more complex data on the nature and the source of the error. Such detailed and complex error data may, at least in part, be unnecessary and/or unrelated to the operations of the HMS 120. Therefore, in some embodiments, the classification performed by the ECM 206 may be more focused on whether the source of an error message is within the service provider 102 or with an outside system or intermediary, outside the control of the service provider 102. In the cases where the source of the issue is within the operations of the service provider 102, for example in the case of internal errors, the output of the HMS 120 can be used to alert appropriate components within the service provider 102 and make changes to address the issue. In the cases where the source of the error message is outside the service provider 102, the service provider 102 can dynamically route its outgoing traffic, based on the output of the HMS 120, to avoid or reduce sending traffic to problematic outside resources.

The timeout category of errors refers to a situation where a response to a request is not received within a timeout window, as defined by the service provider environment 102. There may be multiple timeout windows defined by different local services 114, depending on the underlying services of each or there could be one timeout window defined in the service provider environment globally. Some applications and services can define a shorter timeout window than others. For example, for some local services 114, the timeout window for receiving a response to a request may by less than 5 seconds. If a response is not received in a time less than the timeout window, the local services 114 may send the request to a different remote system 104. Other service providers 102 may define a shorter or longer timeout windows, depending on their underlying services.

The error categories and classifications applied by the ECM 206 can be used by other modules in HMS 120. For example, some modules scan the incoming traffic for error categories related to their operations. In other instances, modules outside the HMS 120 can monitor error categories related to their operations and respond to traffic accordingly. In some respect, the HMS 120 can publish some or all of the error categories, within the service provider 102, making the categorization visible to local services 114. In some embodiments, the ECM 206 can tag the incoming traffic with applicable error categories and classifications, where related local services 114 can react to the error classes related to their operations.

In some embodiments, the traffic, including request/response pair (if a response exists), and the error classification (if an error exists) are passed to a manager 208 to distribute to different modules within the HMS 120. Some embodiments may directly route the traffic and error classifications to the modules of the HMS 120, without a manager 208. The manager 208 can record traffic data or can append meta data to traffic, such as which local services 114 initiated the traffic. In other words, tracking data can potentially be added using manager 208. In some embodiments, the functionality of the manager 208 can be implemented in other modules, for example, the communication module 204 and/or the ECM 206.

The HMS 120 can include a latency monitor 210, which can use traffic timing data over a period of time to determine and/or predict responsiveness of a remote system 104. The HMS 120 can also include a responsiveness scoring monitor (RSM) 212. The RSM 212 can monitor the status of traffic to and from a remote system 104, over a period of time, and assign a responsiveness score to the remote system 104. The responsiveness score can be used by the local services 114 to dynamically route traffic to remote systems 104 that have obtained a higher responsiveness score in the recent past. The HMS 120 can further include a downtime monitor (DTM) 214. The DTM 214 can utilize the error classification received from the ECM 206 to monitor periods of downtime for a remote system 104. The DTM 214 can publish a responsiveness grade or can alternatively publish a flag for a remote system 104, indicating whether the remote system 104 is up and running, or whether it is experiencing a downtime. The HMS 120 can also include a stuck request monitor (SRM) 216. The SRM 216 can monitor traffic and determine if a request has not received an expected response. A stuck request can be flagged and a corresponding local service 114 can take appropriate action, such as sending the request to a different remote system 114, or resetting, reconfiguring, or restarting the connection between a corresponding local service 114 and the remote system 104.

Figure 3:
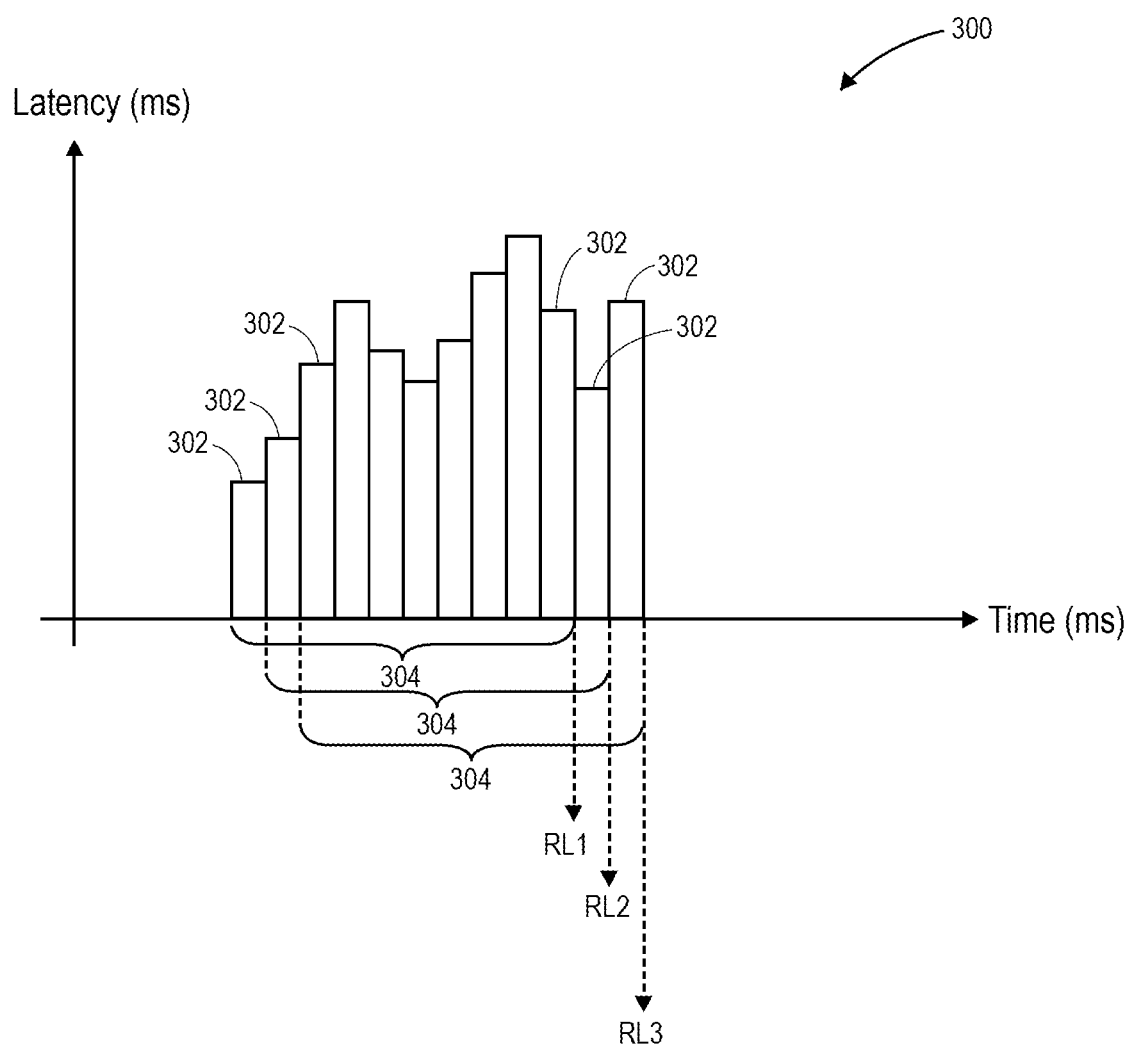
FIG. 3 is a graph illustrating the operations of a latency monitor.

FIG. 3 is a graph 300 illustrating the operations of the latency monitor 210. The latency monitor 210 can establish a rolling window 304 during which it calculates and records the latencies of a remote system 104. On the horizontal axis of the graph 300, time is shown in milliseconds (ms), and on the vertical axis of the graph 300, latencies 302 for pairs of requests/responses associated with a remote system 104 are shown in units of milliseconds (ms), using bars. The rolling window 304 can be established in terms of a predetermined number of past requests/response pairs, or the number of recorded latencies. For example, in some embodiments, a rolling window 304 for the latency monitor 210 can be defined as a window of latencies of received responses for the past 1000 requests. In this example, the size of the rolling window 304 is 1000. Other sizes of the rolling window 304 are also possible.

When requests, responses and associated latencies for a rolling window 304 are received and the rolling window 304 is full, a representative latency (RL) of the latencies in the rolling window can be determined or generated. In one embodiment, the RL can be an average of the latencies recorded in the rolling window 304. Overtime, if the incoming latencies deviate from the RL of a previous rolling window 304 by a larger than a threshold margin, the latency monitor 210 can flag the corresponding remote system 104 as operating in a degraded status. The local services 114 may receive the degraded status of a remote system 104 and route their traffic to other remote systems 104.

Various techniques can be used to compare future latencies to previous latencies to determine whether a remote system 104 is responding to traffic requests with higher-than-expected latencies and, thus, is in a degraded state or is predicted to be in a degraded state. When the rolling window 304 is full, and a new incoming latency 302 is received, the oldest latency 302 is deleted, the new one is added to the rolling window 304 and a new RL is determined. In other words, the rolling window moves in time, as more latencies 302 are received, deleting the oldest and adding the new latency 302, each time calculating the RL in the rolling window 304. Thus RL1, RL2, RL3 and so forth are generated overtime.

In some embodiments, a next latency is compared against the previously calculated RL using standard deviation (SD). The latency monitor 210 can determine the standard deviation of the latencies in a rolling window 304 when the rolling window 304 is full and can subsequently determine the standard deviation of the rolling window 304, as the rolling window 304 receives a new latency and drops the oldest latency. The new latency is compared against the previous rolling window's standard deviation. If the new latency deviates from the previous RL of the rolling window 304, by more than a threshold, the latency monitor 210 can flag the remote system as operating in a degraded state or predicted to be in a degraded state. For example, if a new latency 302 deviates from the RL of the previous rolling window 304, by more than 1 standard deviation, the latency monitor 210 can flag the remote system 104 as operating in a degraded state or predicted to be in a degraded state. Other statistical techniques for averaging the latencies in the rolling window 304, generating the RL, and comparing a new incoming latency to the previous RL can be used. For example, a mean average technique, or mean absolute deviation are among the alternatives which can be used.

Figure 4:
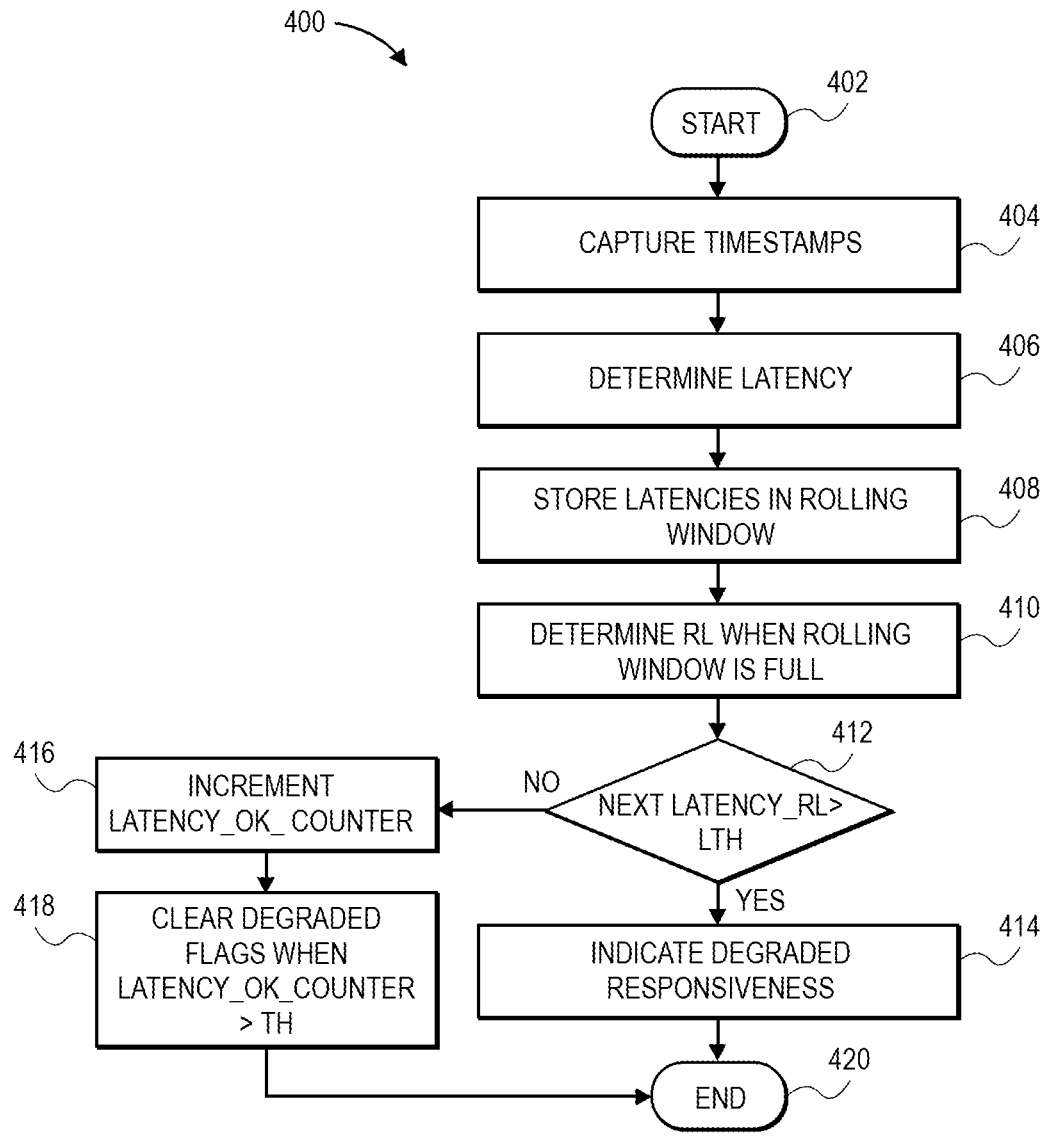
FIG. 4 illustrates a flowchart of a method of the operations of the latency monitor.

FIG. 4 illustrates a flowchart of a method 400 of the operations of the latency monitor 210. The method 400 will be described in relation to monitoring the latencies of one remote system 104, but the latency monitor 210 can perform the same operations with respect to other remote systems 104. The output of the latency monitor 210 with respect to the various remote systems 104 can be compared and used in dynamically routing traffic from the local services 114 to remote systems 104. The method starts at step 402. At step 404, time stamps of each request and time stamps of corresponding responses are captured. In some embodiments, the latency monitor 210 can capture the traffic timing data from the timing module 202 or can alternatively extract the traffic timing data from traffic meta data. At step 406, the latency monitor 210 can determine latencies of receiving responses for each request by subtracting the time of sending of a request from the time of receiving a response for the request.

At step 408, the steps 404 and 406 can be repeated for other outgoing requests and the resulting latencies can be stored in a rolling window 304. The rolling window 304 can be established in terms of a number of requests for which latencies are stored in a memory, such as a cache. Consequently, the rolling window 304 can have a maximum size, established as the number of latencies, or requests for which latencies can be stored. The term "rolling" in rolling window is used to indicate that the rolling window 308 is updated when a new latency value 302 is calculated by deleting the oldest latency 302 in the rolling window 304 and adding the new latency 302 to the rolling window 304. At step 410, when the rolling window 304 is full, the latency monitor 210 determines a representative latency (RL) of the latencies stored in the rolling window 304. The rolling window 304 is full when the stored latencies 302 reach the maximum size of the rolling window. At step 412, the latency monitor 210 can determine whether a new latency 302 deviates from the RL by a margin greater than a threshold. If the new incoming latency deviates from the RL by a margin greater than a latency threshold (LTH), the method moves to step 414, where the latency monitor 210 indicates a degraded responsiveness of the remote system 104 by flagging the remote system 104 with a degraded responsiveness flag.

As described above in relation to FIG. 3, a variety of techniques, including statistical techniques, can be used to determine whether a new incoming latency deviates from the RL of a previous rolling window by greater than an expected threshold. For example, in some embodiments, the RL can be the mean of the latencies recorded in the rolling window. If the difference between a next incoming latency and the RL of a previous rolling window is greater than a latency threshold (LTH), the method can move to the step 414, flagging the remote system as operating in a degraded state or predicted to be in a degraded state. In other embodiments, the standard deviation of the rolling window can be calculated as well as the mean of the latencies stored in the rolling window as the RL. If a new incoming latency deviates from the RL by a threshold, the method can move to step 414, flagging the remote system 104 as operating in a degraded state or predicted to be in a degraded state. For example, in some embodiments, if a new incoming latency deviates from the mean of a previous rolling window by more than 1 standard deviation, the method can move to the step 414, flagging the remote system 104, as operating in a degraded state.

Over time, the RLs and the standard deviations of the rolling window can establish an expected latency for a remote system 104. If a new incoming latency is within the acceptable range of the expected latency of a remote system 104, the method moves to the step 416. At step 416, the latency monitor 210 increments a Latency_OK_Counter. At step 418, the latency monitor 210 clears any degraded latency flags for the remote system 104, if the Latency_OK_Counter is greater than a threshold. The method ends at step 420. In some embodiments, the method can be continuously run, instead of ending at step 420, the rolling window can be rolled forward, adding the next incoming latency by going to step 402.

Figure 5:
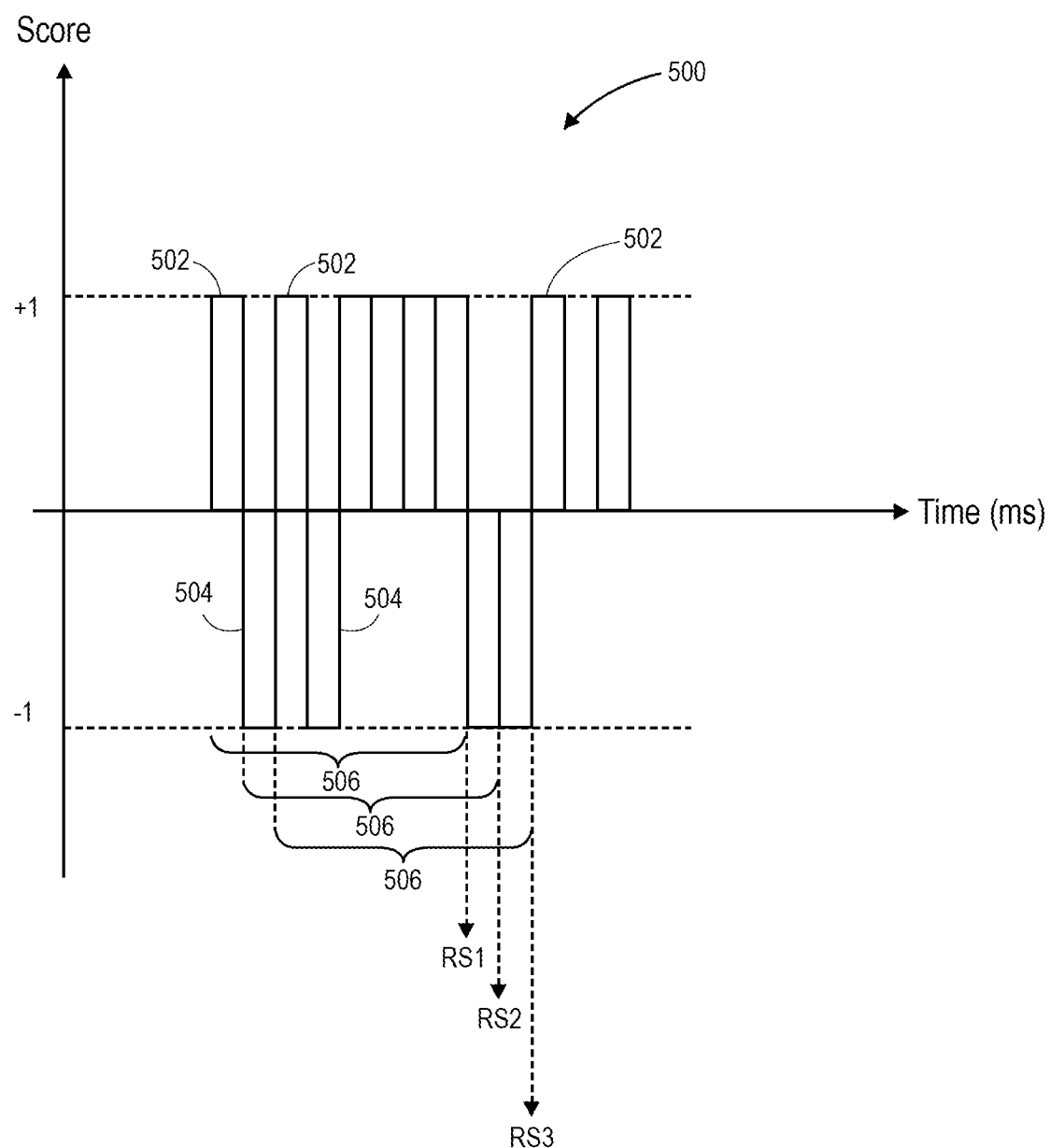
FIG. 5 is a graph illustrating the operations of a responsiveness scoring monitor.

FIG. 5 is a graph 500 illustrating the operations of the responsiveness scoring monitor (RSM) 212. The RSM 212 can track the success and/or failure of a remote system 104 in responding to the requests sent from the local services 114. The RSM 212 operations are described in relation to assessing and scoring responsiveness of one remote system 104, but the RSM 212 can perform the same operations with respect to several remote systems 104. The RSM 212 can publish and update a responsiveness score for each remote system 104. The local services 114 can dynamically route their respective traffic flows, at least in part, based on the published responsiveness scores.

The operations of the RSM 212 can include establishing a rolling window 506, during which success and/or failure scores for the responsiveness of a remote system 104 can be stored. The rolling window 506 can have a size based on a predetermined number of requests, for which success or failure scores can be stored in a cache or memory. For example, in one embodiment, the rolling window 506 can be success or failure scores for 1000 requests. For each request, the RSM 212 monitors whether an error-free response is received from the remote system 104. If an error-free response for the request is received, the RSM 212 records a success score 502 in the rolling window 506 for that request. If a response is not received or received with some errors (attributed to the remote system 104), the RSM 212 can record a failure score 504 for that request. The RSM 212 can determine the external or internal nature/source of an error from the error classification and categorization received from the ECM 206. An example failure score is −1 and an example success score is +1. Other scoring algorithms and numbers can also be used.

As requests are issued from the local services 114 and responses received from a remote system 104, the RSM 212 determines success and/or failure scores 502, 504 and stores them in the rolling window 506 in a cache or other memory. The rolling window 506 has a predetermined size. When the rolling window 506 is full (e.g., the success/failure scores 502, 504 for 1000 previous requests are stored in a cache), the RSM 212, determines a representative score (RS) for the rolling window 506. In some embodiments, the RS can be derived from statistical analysis, such as obtaining the mean of the scores stored in the rolling window. The RS can be used to generate a responsiveness score for the remote system 104. In some embodiments, the responsiveness score is equal to the RS. In other embodiments, the responsiveness score can be generated based on the RS. For example, the RS can be multiplied by a factor to highlight the responsiveness of a remote system 104 whose corresponding rolling windows are filled in shorter duration of time, indicating an efficient and responsive remote system 104. Other weighting schemes can also be implemented when generating the responsiveness score from the RS. The RSM 212 can publish the responsiveness score of a remote system 104 to the local services 114. The local services 114 can dynamically route their respective traffic flows, at least in part based on the responsiveness score, routing more traffic to the more responsive remote systems 104.

When the rolling window 506 is full and an RS is generated, the rolling window 506 moves forward, dropping the score for the oldest request, storing a success/failure score 502, 504 for a new request/response, calculating a new value of RS and responsiveness score. If the new responsiveness score differs from the previous responsiveness score by an RS_TH amount, the RSM 212 can publish the new responsiveness score. In some embodiments, in order to provide improved stability to the published responsiveness score, the RSM 212 can additionally check whether a predetermined time period has elapsed since an updated value of the responsiveness score was published, before publishing a new responsiveness score. If the new responsiveness score is the same or within an RS_TH amount of the old responsiveness score, the RSM 212 can continue rolling the rolling window 506 forward and repeating the RS calculation for a new window.

Figure 6:
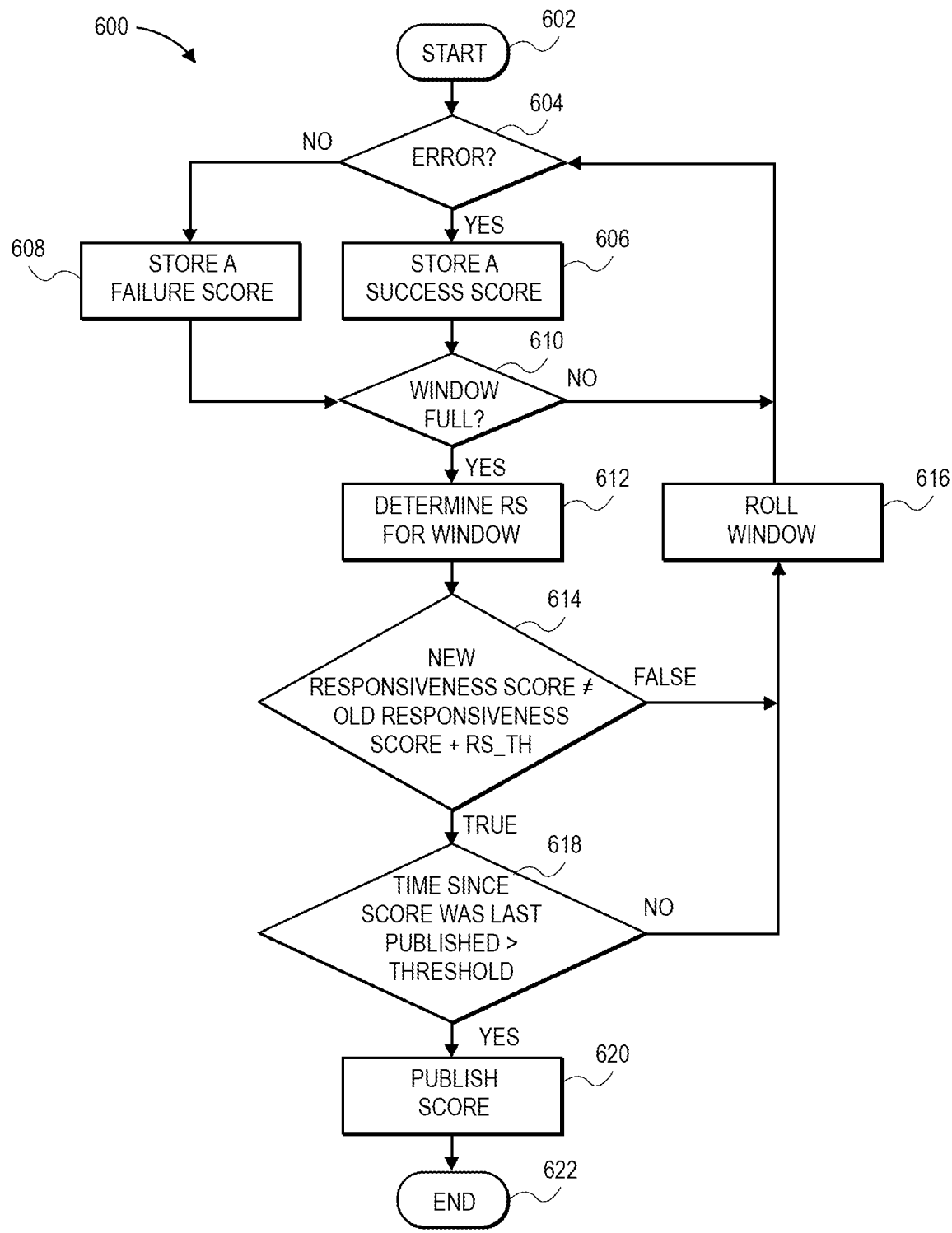
FIG. 6 illustrates a flowchart of a method of the operations of the responsiveness scoring monitor.

FIG. 6 illustrates a flowchart of a method 600 of the operations of the responsiveness scoring monitor (RSM) 212. The method starts at step 602. The method will be described in relation to scoring responsiveness of one remote system 104, but the RSM 212 can perform the same method for more than one remote system 104. Responsive scores of multiple remote systems 104 can be used to dynamically route traffic from the local services 114 to more responsiveness remote systems 114. At step 604, the RSM 212 can identify if an outgoing request has received an error-free response from a remote system 104. The nature and source of any error message associated with a request can be found from the data or metadata provided by the ECM 206. In some embodiments, responses received along with an internal error classification will be excluded, so as to not impact the responsiveness score of a remote system 104. At step 606, the RSM 212 records a success score 502 in a rolling window 506, in a cache or memory if the request has received an error-free response from the remote system 104. At step 608, the RSM 212 records a failure score 504 in the rolling window 506 if no response is received for the request, or if the response is received with some error classification attributable to the remote system 104 (e.g., a remote error).

At step 610, the RSM 212 determines whether the rolling window 506 is full. The rolling window 506 is full when success/failure scores 502, 504 for a predetermined number of requests have been stored in a cache or memory. If the rolling window 506 is yet not full, the method loops back to step 602, storing more success/failure scores 502, 504 in the rolling window 506. If the rolling window 506 is full, the method moves to step 612 and determines a representative score (RS) for the rolling window 506. The RS can be a mean value of the scores stored in the rolling window 506 or can be derived based on other statistical techniques from the success/failure scores 502, 504, stored in the rolling window 506. The RS can be used to generate a responsiveness score for the scores stored in the rolling window 506.

At step 614, the RSM 212, compares a newly generated responsiveness score against a previous responsiveness score. If the two are identical or only differ in an amount less than RS_TH, the method moves to step 616, rolling the rolling window 616 forward and repeating the method from step 602 or 604. If the newly generated responsiveness score differs from the previous responsiveness score by more than an RS_TH amount, the method moves to step 618. At step 618, the RSM 212 determines whether the amount of time since an updated responsiveness score was published exceeds a threshold. If yes, the method moves to step 620 and the RSM 212 publishes the new responsiveness score. If no, the method moves to step 616, rolling the rolling window 506 forward, repeating the method from step 602. The method ends at step 622. The method 600 can be continuously performed in loops from 602 to 620, without the end step 622, in order to continuously determine and publish responsiveness scores for the remote systems 104.

Figure 7:
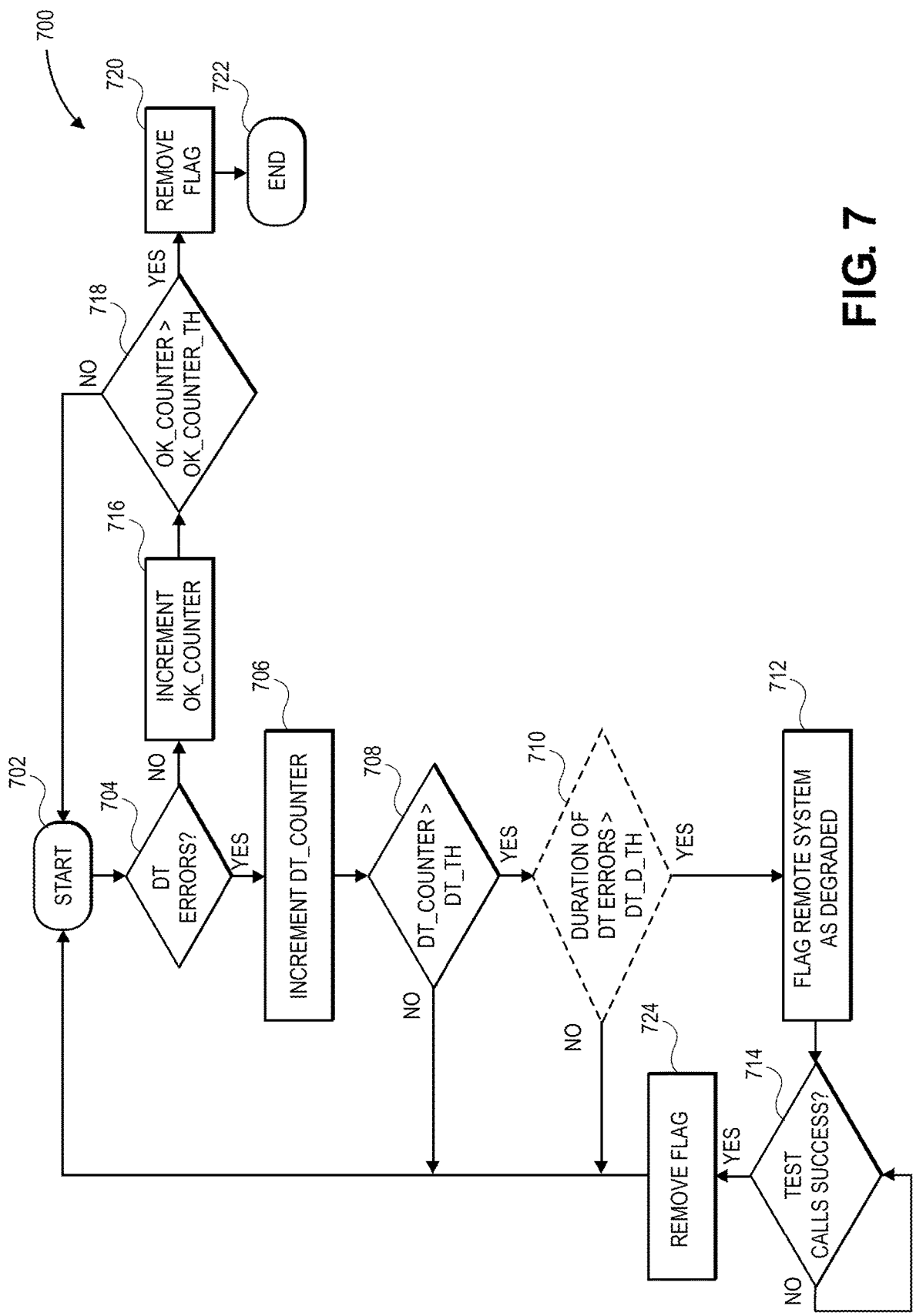
FIG. 7 illustrates a flowchart of a method of the operations of a downtime monitor.

FIG. 7 illustrates a flowchart of a method 700 of the operations of the downtime monitor (DTM) 214. The method will be described in relation to monitoring downtime status of one remote system 104, but the DRM 214 can perform the same operations for more than one remote system 104. The local services 114 can use the output of the DTM 214 to route their respective traffic to remote systems 104 that are not flagged as degraded. The method starts at step 702. At step 704, the DTM 214 determines whether a downtime (DT) error associated with a request sent to a remote system 104 is detected. If yes, the method moves to step 706 and increments a downtime error counter (DT_Counter). AT step 708, if the DT_Counter is greater than a downtime threshold (DT_TH), the method moves to step 710. At step 710, a duration of downtime errors is determined. Determining such timing data can be programmed in the timing module 202. Alternatively, the DTM 214 can determine the duration of downtime errors associated with the remote system 104, by obtaining timing data from the timing module 202. Determining a duration of downtime errors can involve subroutine operations including, recording a time first a downtime error is encountered and subtracting the first time encountered from the last time the same downtime error is encountered. If the duration of downtime errors is greater than a downtime duration threshold (DT_D_TH), the method moves to step 712, where the remote system 104 is flagged as in a degraded state, in a downtime state or predicted to be in downtime. In some embodiments, step 710 may be optional.

At step 714, a test module monitors if there is any flag generated at step 712 and performs test calls to the remote system 104 when it detects a flag. If a predetermined number of test calls succeed, the method moves to step 724, where the test module removes the degraded or downtime state flag. The method then moves to step 702. At step 704 if the DTM 214 determines that there is no downtime error, the error is not attributable to the remote system 104, and/or the error is not a downtime error, the method moves to step 716. At step 716, an OK_Counter is incremented. At step 718, if the OK_Counter is greater than an OK_Counter_TH, the method moves to step 720, removing any degraded or downtime flag associated with the remote system 104. The method ends at step 722. Alternatively, the step 722 can be eliminated and the method 700 can repeat from step 702 to continuously monitor any downtime status of the remote system 104.

Figure 8:
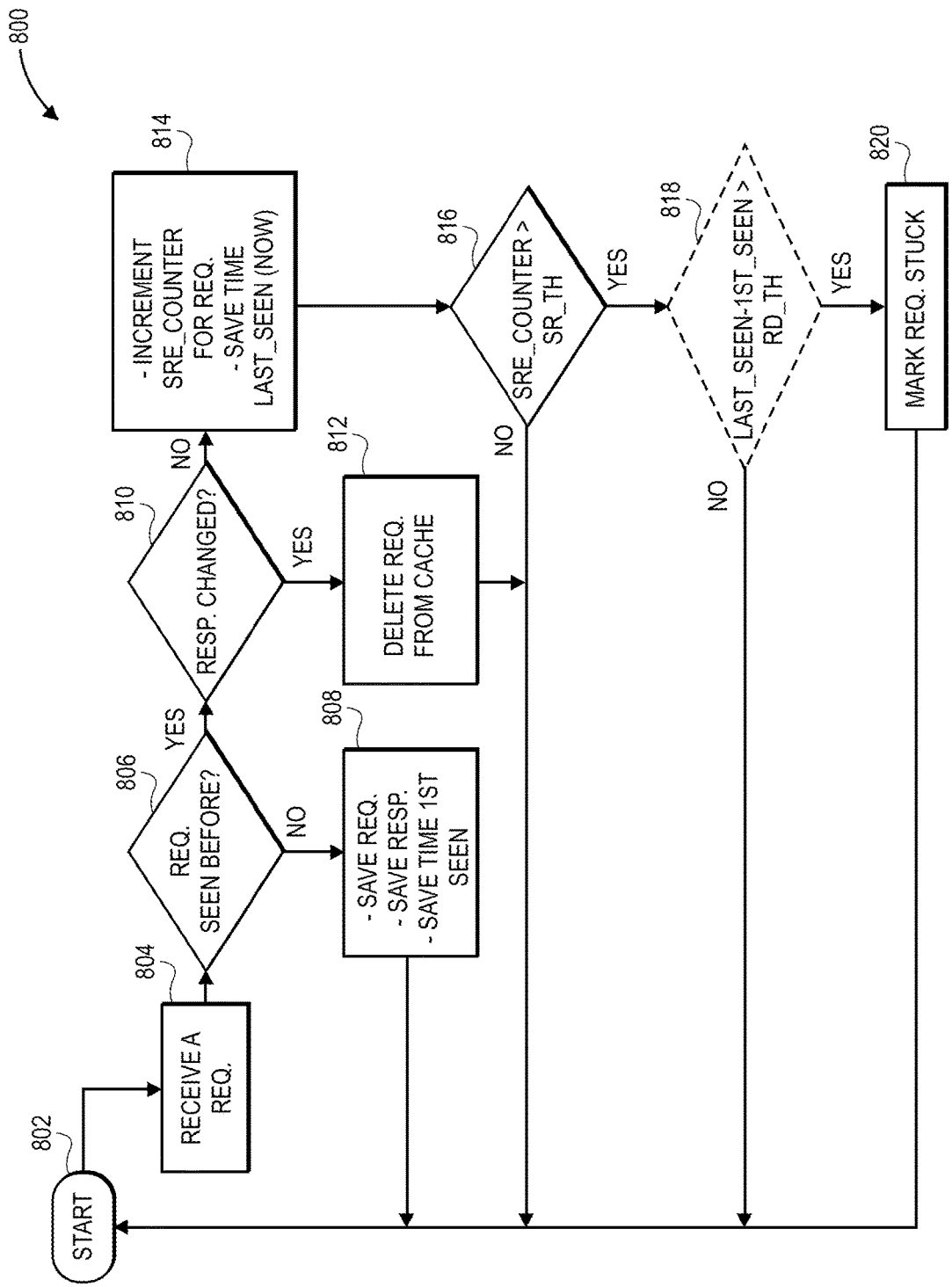
FIG. 8 illustrates a flowchart of a method of the operations of a stuck request monitor.

FIG. 8 illustrates a flowchart of a method 800 of the operations of the stuck request monitor (SRM) 216. The SRM 216 can determine whether a request to a remote system 104 is made repeatedly, without receiving a response or without receiving an expected change in the response. The SRM 216 can mark such requests as stuck requests. The local services 114, which issued the stuck request can take remedial action. For example, in some situations, restarting the connection between the local services 114 and the remote system 104 can unstuck the request. In other instances, the local services 114 may change the configuration or format of the response or can otherwise further troubleshoot the stuck request.

The method starts at step 802. At step 804, a request is received. At step 806, the SRM 216 determines whether the request is a repetitive request. To determine whether a request is repetitive, the SRM 216 can maintain a cache of requests it receives. If the request cannot be found in the cache, the method moves to step 808, where the request is saved. A response corresponding to the request can also be stored in the cache. A lack of response from the remote system 104 can also be saved as a no_response text string, or other indicators. If the request is saved for the first time, a time stamp of first encountering the request is also saved in the cache. If the request was previously stored in the cache, the method moves to step 810, where the current response is compared against the previously stored response. If the response has changed, this can indicate that the request is unstuck. The method moves to step 812, where the request and associated data are deleted from the cache. The process moves to step 802

If the current response relative to the previously stored response has not changed, the request may be stuck. The method moves to step 814, where a stuck_request error counter (SRE_Counter) associated with the request is incremented. A timestamp of the request is also stored in the cache. For example, the current time can be stored as the timestamp, indicating the last most recent time a response has been encountered. The method moves to step 816, where the SRM 216 determines whether the SRE_Counter is greater than a stuck request threshold (SR_TH). If no, the method moves to step 802. If yes, the method moves to step 818, where the SRM 216 determines a duration of time for which the request has not received a change in the corresponding response. The SRM 216 can determine this time duration by subtracting the time the request was last seen from the timestamp the request was first seen. (last seen— 1ST_seen). If the duration of time between the time first seen and the time last seen is greater than a repetition duration threshold (RD_TH), the method moves to step 820, where the SRM 216 marks the request as stuck. The method moves to the step 802, where it continues to monitor other requests and mark the stuck ones. The requests marked stuck can be caught by or sent to the corresponding local services 114, which issued them. The issuing local service 114 can take corrective action. In some embodiments, step 818 can be optional.

Figure 9:
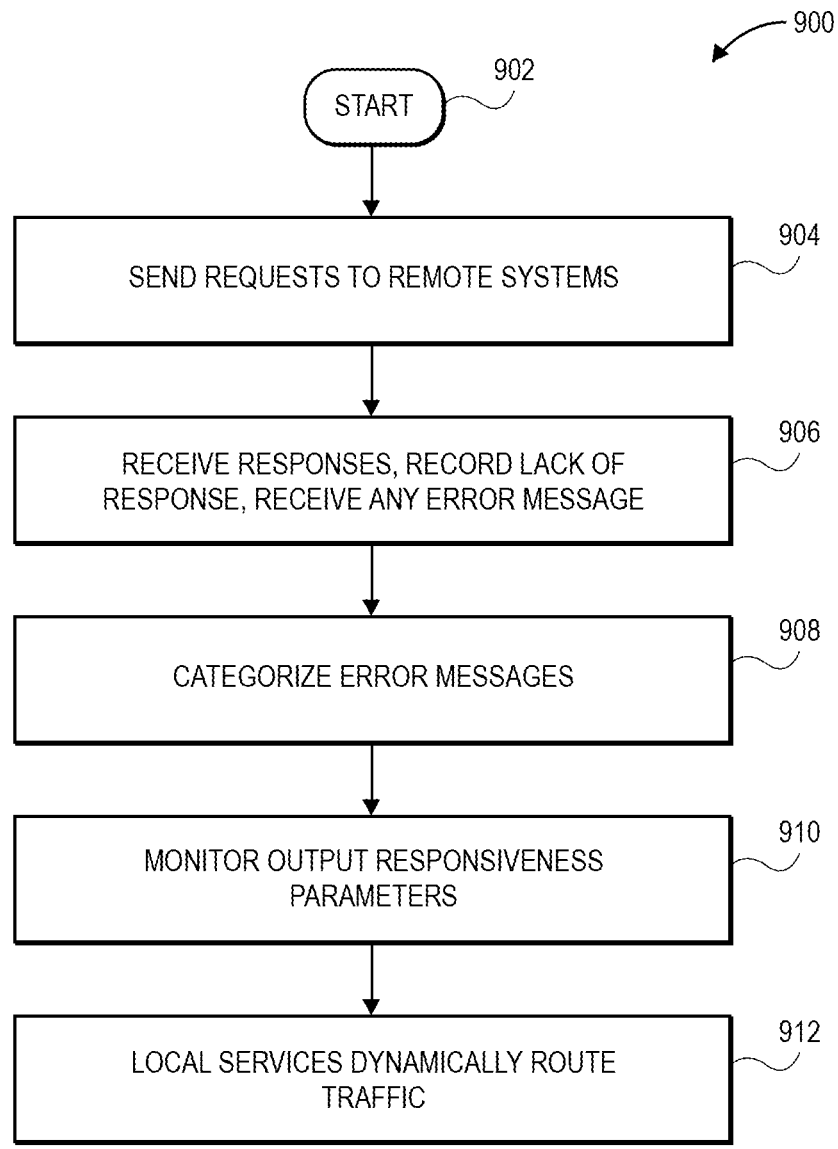
FIG. 9 illustrates a flowchart of a method of dynamically routing traffic in the computer network environment of the embodiment of FIG. 1.

FIG. 9 illustrates a flowchart of a method 900 of utilizing the output of the HMS 120 to dynamically route traffic. The method starts at step 902. At step 904, the local services 114 send requests to the remote systems 104. The requests depend on the nature of the underlying services provided by the service provider 102 and the communication protocol specified by the remote systems 104. For example, the request may be an HTTP request, a Websocket request, an HTTP/REST request, FIX request or requests based on other protocols. At step 906, the local services 114 receives responses from the remote systems 104. Any lack of response is recorded along with the request whose response is missing. The responses can also include a variety of error messages in a variety of formats. At step 908, the ECM 206 can categorize and/or classify the errors into error categories used by the HMS 120 and the local services 114. For example, in some embodiments, various categories of errors include internal errors, external errors, timeout errors, rate limiting errors and others. In some cases, the raw errors received from the remote systems 104 and/or intermediaries can be numerous and detailed, while the ECM 206 broadly categorizes the errors, in part, to indicate whether a source of an error is internal to the service provider 102, or whether it is external and related to the remote system 104, or an intermediary, outside the control of the service provider 102. Internal errors can be excluded from determination of the responsiveness of the remote system 104.

At step 910, the requests, the associated responses, and the associated error categories are transmitted to one or more monitors, such as latency monitor 210, RSM 212, DTM 214 and SRM 216. Each monitor outputs a responsiveness parameter of the remote system 104, based on the request, response, and/or the error categories. Responsiveness parameters can include a degraded responsiveness flag from the latency monitor 210, a responsiveness score from the RSM 212, a downtime flag from the DTM 214, and a stuck response flag from the SRM 216. At step 912, the responsiveness parameters are transmitted to the local services 114 or alternatively are published to the local services 114. The local services 114 dynamically route their future requests, based, at least in part, on the responsiveness parameters. The method can continuously run from step 902, updating the responsiveness parameters, as more requests are sent, and more responses are received.

Dynamic Traffic Routing

The data from the HMS 120 can be robust when the local services 114 make numerous calls to the remote systems 104. As a result, dynamic traffic routing using the output of the HMS 120 can be robust and based on a more in-depth historical responsiveness of the remote systems 104. In practical applications, responsiveness of the remote systems 104 can be a fluid and dynamic parameter, increasing at times and decreasing at other times. Consequently, the HMS 120 can be more suited to managing a dynamic traffic flow, compared to systems that consider fewer parameters and are more binary in nature than dynamic, when making routing decisions.

In some embodiments, the output of the HMS 120 can be used for prediction of future unexpected outages of a remote system 104. Routing traffic based on such predictions can be beneficial for the service providers 102, particularly in cases where their underlying services are time-critical. Furthermore, a weighting algorithm can be used to dynamically route traffic based on the output of the HMS 120. For example, some markers, flags, and indicators from the HMS 120 can be given higher weights, while others can be given less weight in dynamic traffic routing. For example, the output of the DTM 214 can be given higher weight in routing traffic than the output of the RSM 212 because a downtime duration can be more detrimental to the traffic flow than an up and running remote system 104, which may otherwise have a lower responsiveness score.

Example Implementation Mechanism Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-pur pose computing devices may be server computers, cloud computing computers, desktop computer systems, portable computer systems, handheld devices, networking devices or any other device that incorporates hard-wired and/or program logic to implement the techniques.

Figure 10:
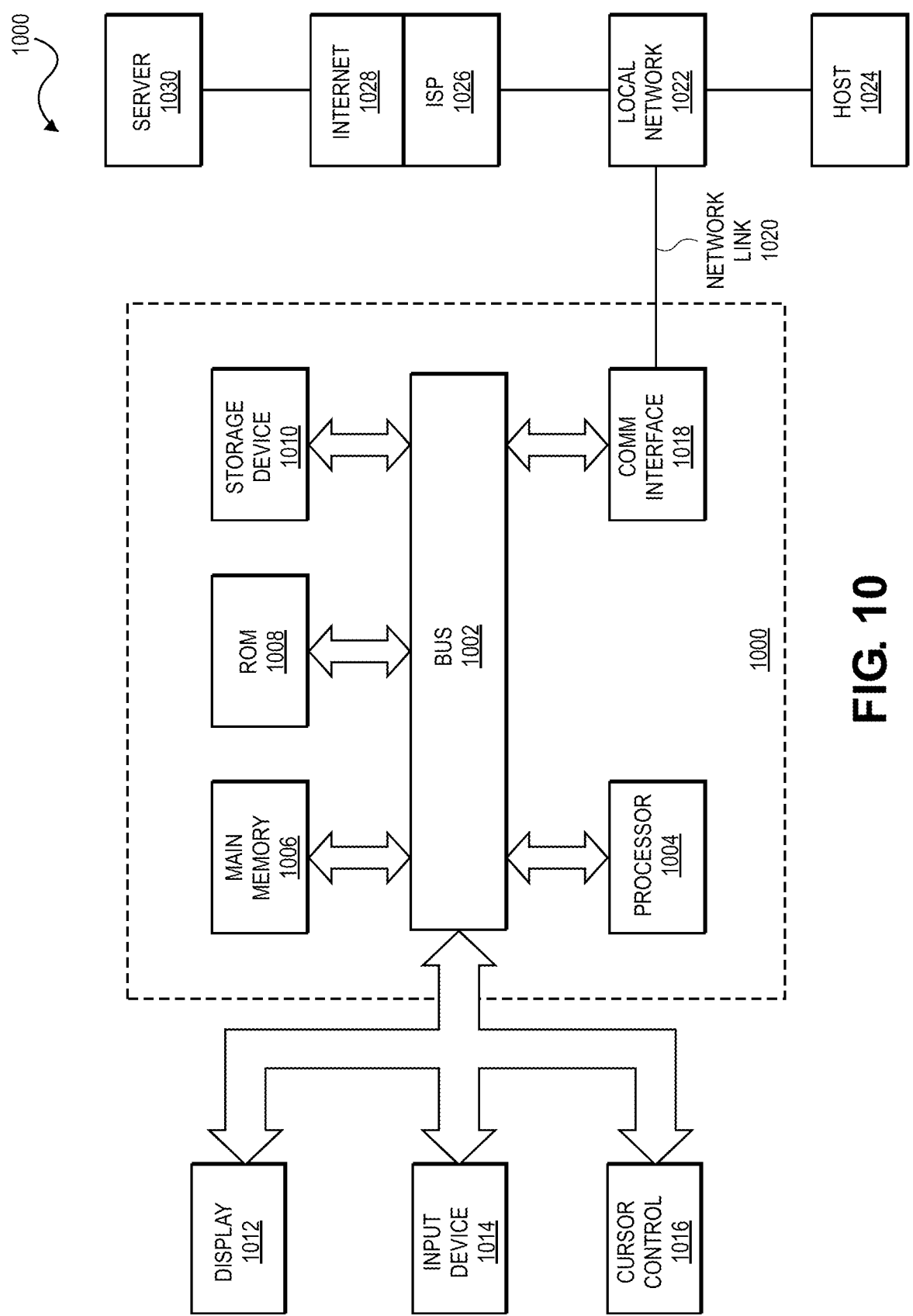
FIG. 10 illustrates an environment in which some embodiments may operate.

For example, FIG. 10 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touchscreen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A method comprising:
    sending a plurality of requests to a plurality of remote systems;
    receiving responses from the remote systems to the plurality of the requests;
    determining latencies of receiving responses for the requests;
    recording the latencies in a rolling window, the rolling window having a rolling window size;
    when the rolling window is full, receiving an incoming latency;
    deleting an oldest latency in the rolling window;
    adding the received incoming latency to the rolling window;
    when the latencies recorded in the rolling window reaches the rolling window size, determining a representative latency of the latencies recorded in the rolling window;
    determining a difference between a future latency and the representative latency; and
    when the difference is greater than a latency threshold, indicating a degraded responsiveness of a remote system.

2. The method of claim 1, wherein the requests and/or responses comprise web traffic.

3. The method of claim 1, further comprising sending future requests to the remote systems, not having an indication of a degraded responsiveness.

4. The method of claim 1, further comprising publishing the indication of degraded responsiveness to one or more local services sending the plurality of the requests.

5. The method of claim 1, wherein the representative latency and/or determining the difference between a future latency and the representative latency are determined based on statistical techniques.

6. The method of claim 1, further comprising:
    establishing an expected latency range for a remote system;
    monitoring incoming latencies;
    incrementing an acceptable latency counter when an incoming latency is within the expected latency range; and
    clearing the indication of degraded responsiveness of the remote system when the acceptable latency counter is incremented above an acceptable latency counter threshold.

7. The method of claim 1, further comprising:
    generating one or more responsiveness scores for one or more of the remote systems, wherein sending the plurality of the requests to the plurality of the remote systems is at least in part based on the responsiveness scores of the remote systems.

8. Non-transitory computer storage that stores executable program instructions that, when executed by one or more computing devices, configure the one or more computing devices to perform operations comprising:
    sending a plurality of requests to a plurality of remote systems;
    receiving responses from the remote systems to the plurality of the requests;
    determining latencies of receiving responses for the requests;
    recording the latencies in a rolling window, the rolling window having a rolling window size;
    when the rolling window is full, receiving an incoming latency;
    deleting an oldest latency in the rolling window;
    adding the received incoming latency to the rolling window;
    when the latencies recorded in the rolling window reaches the rolling window size, determining a representative latency of the latencies recorded in the rolling window;
    determining a difference between a future latency and the representative latency; and
    when the difference is greater than a latency threshold, indicating a degraded responsiveness of a remote system.

9. The non-transitory computer storage of claim 8, wherein the requests and/or the responses comprise web traffic.

10. The non-transitory computer storage of claim 8, wherein the operations further comprise sending future requests to the remote systems, not having an indication of a degraded responsiveness.

11. The non-transitory computer storage of claim 8, wherein the operations further comprise publishing the indication of degraded responsiveness to one or more local services sending the plurality of the requests.

12. The non-transitory computer storage of claim 8, wherein the representative latency and/or determining the difference between a future latency and the representative latency are determined based on statistical techniques.

13. The non-transitory computer storage of claim 8, wherein the operations further comprise:
    establishing an expected latency range for a remote system;
    monitoring incoming latencies;
    incrementing an acceptable latency counter when an incoming latency is within the expected latency range; and
    clearing the indication of degraded responsiveness of the remote system when the acceptable latency counter is incremented above an acceptable latency counter threshold.

14. The method of claim 8, wherein the operations further comprise:
    generating one or more responsiveness scores for one or more of the remote systems, wherein sending the plurality of the requests to the plurality of the remote systems is at least in part based on the responsiveness scores of the remote systems.

15. A system comprising one or more processors, the one or more processors configured to perform operations comprising:

sending a plurality of requests to a plurality of remote systems;

receiving responses from the remote systems to the plurality of the requests;

determining latencies of receiving responses for the requests;

recording the latencies in a rolling window, the rolling window having a rolling window size;

when the rolling window is full, receiving an incoming latency;

deleting an oldest latency in the rolling window;

adding the received incoming latency to the rolling window;

when the latencies recorded in the rolling window reaches the rolling window size, determining a representative latency of the latencies recorded in the rolling window;

determining a difference between a future latency and the representative latency; and when the difference is greater than a latency threshold, indicating a degraded responsiveness of a remote system.

16. The system of claim 15, wherein the operations further comprise sending future requests to the remote systems, not having an indication of a degraded responsiveness.

17. The system of claim 15, wherein the operations further comprise publishing the indication of degraded responsiveness to one or more local services sending the plurality of the requests.

18. The system of claim 15, wherein the representative latency and/or determining the difference between a future latency and the representative latency are determined based on statistical techniques.

19. The system of claim 15, wherein the operations further comprise:

establishing an expected latency range for a remote system;

monitoring incoming latencies;

incrementing an acceptable latency counter when an incoming latency is within the expected latency range; and clearing the indication of degraded responsiveness of the remote system when the acceptable latency counter is incremented above an acceptable latency counter threshold.

20. The system of claim 15, wherein the requests and/or the responses comprise web traffic.

* * * * *